(12) United States Patent
Hofmann et al.

(10) Patent No.: US 6,823,411 B2
(45) Date of Patent: Nov. 23, 2004

(54) N-WAY PSUEDO CROSS-BAR HAVING AN ARBITRATION FEATURE USING DISCRETE PROCESSOR LOCAL BUSSES

(75) Inventors: Richard Gerard Hofmann, Wake, NC (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 10/059,558

(22) Filed: Jan. 30, 2002

(65) Prior Publication Data

US 2003/0145144 A1 Jul. 31, 2003

(51) Int. Cl.[7] .......................... G06F 13/14; G06F 13/38
(52) U.S. Cl. ........................ 710/110; 710/309; 709/208
(58) Field of Search ................................. 710/110, 107, 710/113, 309, 240, 317; 709/208, 253; 370/461–462; 712/32

(56) References Cited

U.S. PATENT DOCUMENTS

| | | | | |
|---|---|---|---|---|
| 5,619,726 A | * | 4/1997 | Seconi et al. ................. | 710/22 |
| 5,796,413 A | * | 8/1998 | Shipp et al. ................. | 345/522 |
| 5,923,859 A | * | 7/1999 | Melo et al. ................. | 710/113 |
| 5,970,234 A | * | 10/1999 | Jin .............................. | 710/111 |
| 6,070,205 A | * | 5/2000 | Kato et al. ................. | 710/100 |

OTHER PUBLICATIONS

"VLSI design of a bus arbitration module for the 68000 series of microprocessors" by Ososanya, E.T.; McGlone, M.D.; Strong, T.D. (abstract only).*

"An efficient controller scheme for MPEG–2 video decoder" by Nam Ling; Nien–Tsu Wang; Duan–Juat Ho (abstract only).*

* cited by examiner

Primary Examiner—Gopal C. Ray
(74) Attorney, Agent, or Firm—Carr LLP; Robert M. Carwell

(57) ABSTRACT

A bus architecture is provided to facilitate communication between independent bus masters and independent bus slaves by having two or more bus arbiters in a system-on-chip (SOC) system. Each bus master in the system is coupled to all bus arbiters in the system, so that each bus master can access a corresponding bus slave concurrently as well as sequentially. Such concurrent communication carries not only read and/or write data but also a target address of the corresponding bus slave, thereby enabling true concurrency in data communication between bus masters and bus slaves.

23 Claims, 4 Drawing Sheets

# N-WAY PSUEDO CROSS-BAR HAVING AN ARBITRATION FEATURE USING DISCRETE PROCESSOR LOCAL BUSSES

BACKGROUND OF THE INVENTION

1. Field of the Invention

The invention relates generally to a bus architecture in a computer system and, more particularly, to an improved bus architecture having two or more bus arbiters and enabling both concurrent data communications between independent bus masters and independent bus slaves.

2. Description of the Related Art

In system-on-a-chip (SOC) systems that utilize a processor local bus (PLB) protocol and a single PLB bus arbiter, requests for read followed by read ("read-read") and write followed by write ("write-write") are "blocking" in that the data tenures are serialized. This blocking results from sequential in-order address tenures. In the case of a single bus master requesting read-read or write-write to the same or different bus slaves, the resultant serialized accesses are expected and required to maintain sequential ordering consistency. In the case of independent bus masters attempting to access separate and independent bus slaves, the single PLB approach forces the sequential ordering on both the address and data busses. In the case of independent bus masters accessing independent bus slaves, however, it is desirable, for optimal performance, to allow the individual, independent request address and data tenures to execute concurrently and be non-blocking. This allows simultaneous transfers, in the same direction, to occur between independent pairs of bus masters and bus slaves.

Therefore, there is a need for a bus architecture that enables concurrent data communications between independent bus masters and independent bus slaves

SUMMARY OF THE INVENTION

In one embodiment of the present invention, a system is provided to include a first bus master and a second bus master. A first bus arbiter is coupled to the first and the second bus masters. A second bus arbiter is coupled to the first and the second bus masters. A first bus slave is coupled to the first bus arbiter. The first bus master requests a first data operation on the first bus slave via the first bus arbiter. The first data operation is performed during a first period. A second bus slave is coupled to the second bus arbiter. The second bus master requests a second data operation on the second bus slave via the second bus arbiter. The second data operation is performed during the first period.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

The principles of the present invention and their advantages are best understood by referring to the illustrated operations of embodiment depicted in FIGS. 1–4.

Figure 1:
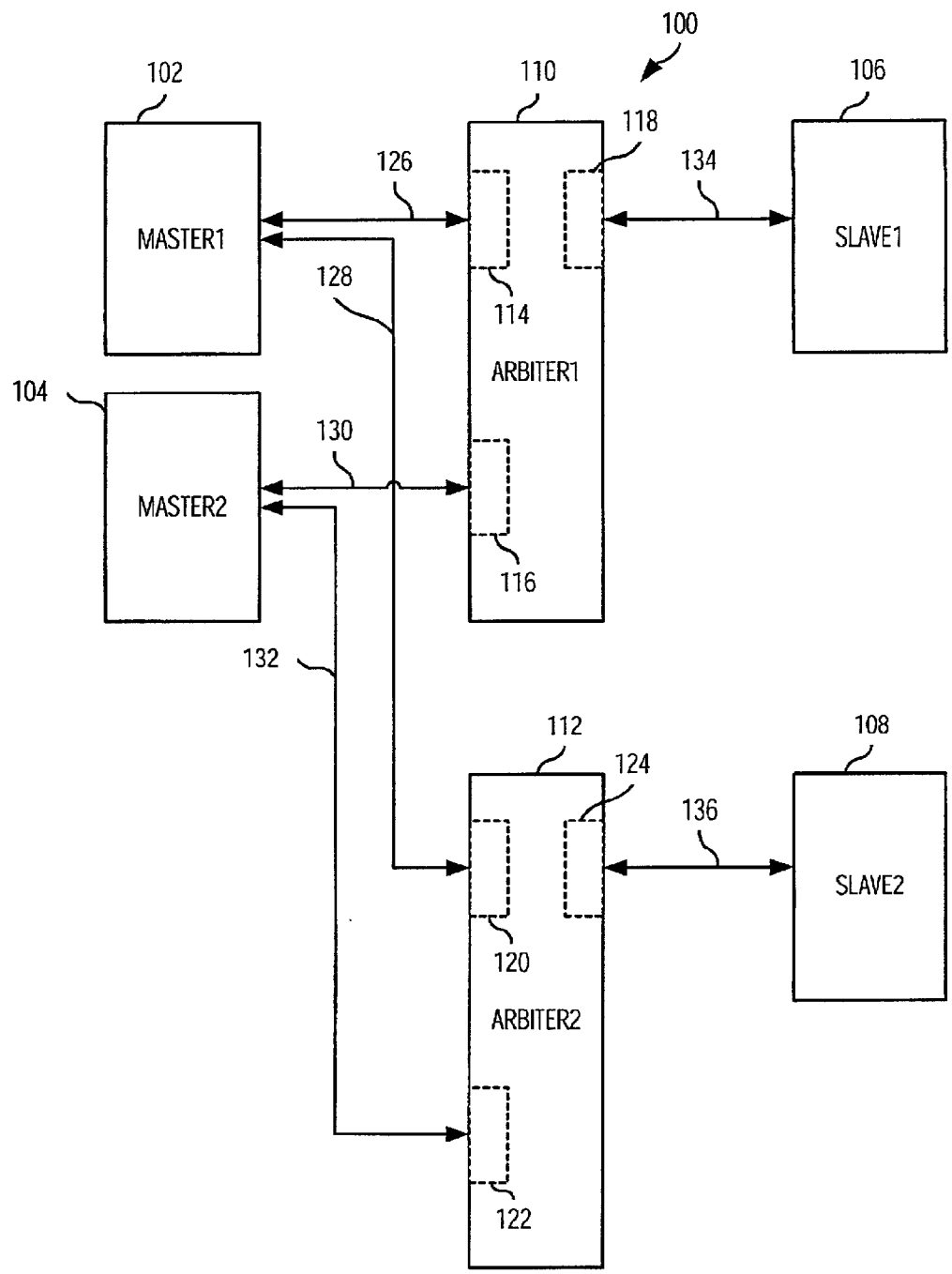
FIG. 1 depicts a block diagram showing a psuedo-crossbar configuration between two bus masters and two bus slaves using two processor local bus arbiters.

In FIG. 1, a block diagram 100 is shown to illustrate a psuedo-crossbar configuration between two bus masters master1 102 and master2 104 and two bus slaves slave1 106 and slave2 108 using two processor local bus (PLB) arbiters arbiter1 110 and arbiter2 112. The master1 102 is coupled to the arbiter1 110 and the arbiter2 112 to access the slave1 106 and the slave2 108, respectively. Similarly, the master2 104 is coupled to the arbiter1 110 and the arbiter2 112 to access the slave1 106 and the slave2 108, respectively. Preferably, the arbiter1 110 has a master1 port 114 to communicate with the master1 102, a master2 port 116 to communicate with the master2 104, and a slave port 118 to communicate with the slave1 106. Likewise, the arbiter2 112 has a master1 port 120 to communicate with the master1 102, a master2 port 122 to communicate with the master2 104, and a slave port 124 to communicate with the slave1 106.

A bus 126 couples the master1 102 and the arbiter1 110, and carries various signals from the master1 102 to the arbiter1 110. Such signals carried on the bus 126 may contain an arbitration request, an address, transfer qualifiers, write data, and control data. Similarly, the bus 126 carries other signals from the arbiter1 110 to the master1 102. Such other signals may contain read data and status-and-control data. Similarly, a bus 128 couples the master1 102 and the arbiter2 112, and carries various signals from the master1 102 to the arbiter2 112. Such signals may contain an arbitration request, an address, transfer qualifiers, write data, and control data. Similarly, the bus 128 carries other signals from the arbiter2 112 to the master1 102. Such other signals may contain read data and status-and-control data. Preferably, the busses 126 and 128 are connected to the master1 102 as one bus and are separately connected to the arbiter1 110 and the arbiter2 112, respectively. Alternatively, the busses 126 and 128 are separately connected to the master1 102 as well.

A bus 130 couples the master2 104 and the arbiter1 110 in the same manner as the bus 126 couples the master1 102 and the arbiter1 110. Likewise, a bus 132 couples the master2 104 and the arbiter2 112 in the same manner as the bus 128 couples the master1 102 and the arbiter2 112.

A bus 134 couples the arbiter1 110 and the slave1 106, and carries various signals from the arbiter1 110 to the slave1 106. Such signals carried on the bus 134 may contain an address, transfer qualifiers, write data, and control data. Similarly, the bus 134 carries other signals from the slave1 106 to the arbiter1 110. Such other signals may contain read data and status-and-control data.

Likewise, a bus 136 couples the arbiter2 112 and the slave2 108, and carries various signals from the from the arbiter2 112 to the slave2 108. Such signals carried on the bus 136 may contain an address, transfer qualifiers, write data, and control data. Similarly, the bus 136 carries other signals from the slave2 108 to the arbiter2 112. Such other signals may contain read data and status-and-control data. Preferably, the busses 130 and 132 are connected to the master2 104 as one bus and are separately connected to the arbiter1 110 and the arbiter2 112, respectively. Alternatively, the busses 130 and 132 are separately connected to the master2 104 as well.

In the psuedo-crossbar configuration as shown in FIG. 1, two or more arbiters such as the arbiter1 110 and the arbiter2 112 attach a master such as the master1 102 and the master2 104 to appropriate arbiters coupled to a target slave of the master. The individual master's request is "steered" to the appropriate arbiter based on a full or partial decode of the requested target address of the target slave. For example, if the master1 102 requests a write operation to the slave1 106, the request is steered to the arbiter coupled to the slave1 106 based on a full or partial decode of a target address of the slave1 106. In one embodiment, address, transfer qualifiers, and write data are broadcast to all corresponding arbiters connected to an associated master port such as the master1 port 114 and the master2 port 116. Alternatively, the address, transfer qualifiers, and write data are broadcast to the corresponding master port on each arbiter.

Read data, status, and control input for each master are created by combining output signals of individual associated master port of each arbiter via an OR logic and connecting the result to the corresponding masters' inputs. For example, if the master1 102 requests a read operation to the slave1 106, the request is steered to the arbiter coupled to the slave1 106 based on a full or partial decode of a target address of the slave1 106. In this case, the bus126 in conjunction with the bus 128 carries the requested read data, status, and control input for the master1 102 by combining output signals of the master1 port 114 and the master2 port 120 via an OR logic (not shown).

A gating logic (not shown) may be used to disallow back-to-back pipelined read-read and write-write requests to different arbiters such as arbiter1 110 and 112. This prevents data collisions which could otherwise occur on a bus such as the bus 126 due to simultaneous responses to the serialized requests. With this architecture, independent masters and slaves can communicate concurrently (i.e., during the same PLB clock cycle(s)) over independent processor local busses (PLBs).

Figure 2:
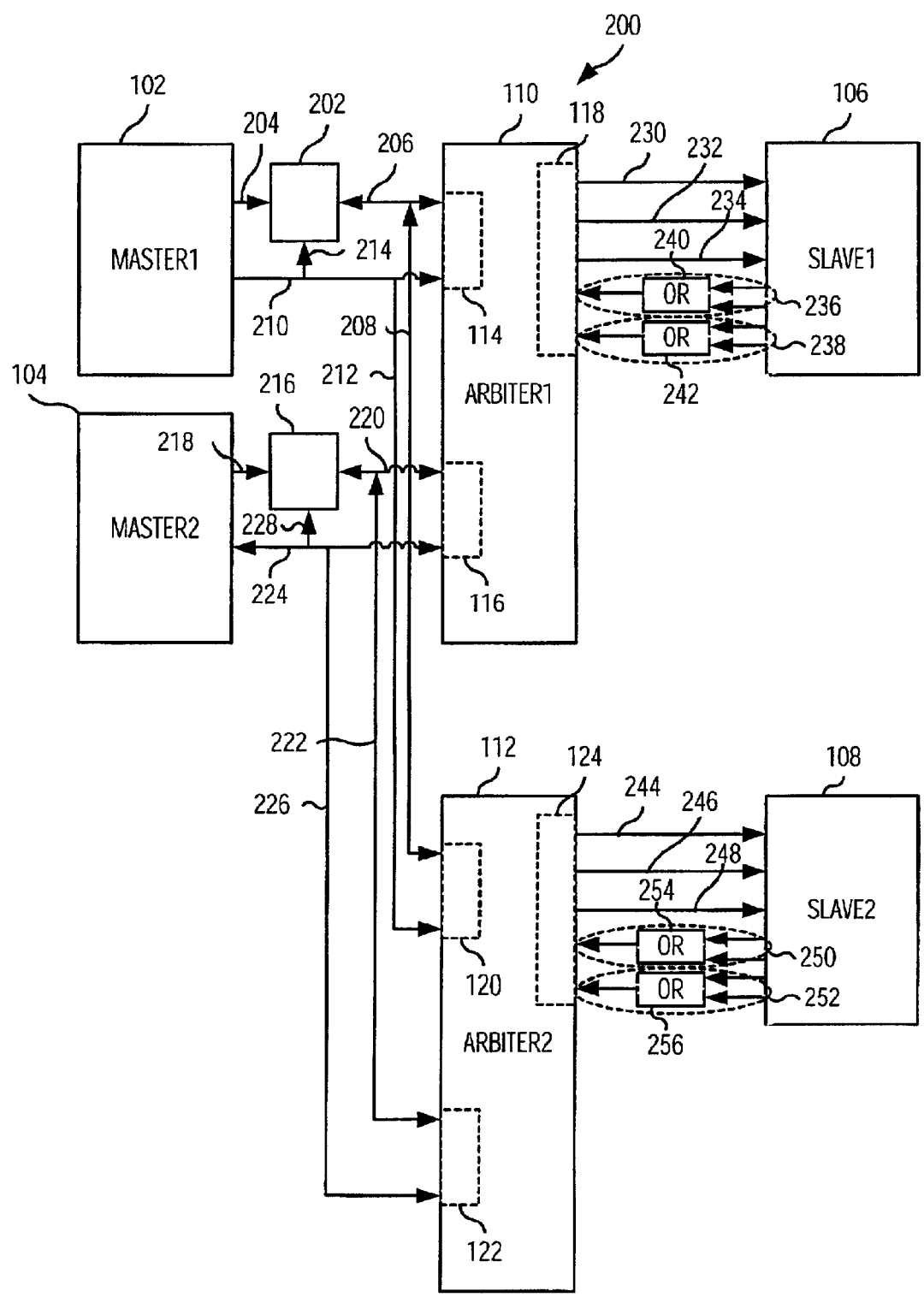
FIG. 2 depicts a block diagram showing an address-and-request operation in the psuedo-crossbar configuration of FIG. 1.

Now referring to FIG. 2, a block diagram 200 illustrates an address-and-request operation in the psuedo-crossbar configuration of FIG. 1. The master1 102 is coupled to a gating logic 202 via a bus 204 to transmit an arbitration request from the master1 102 to the gating logic 202. The gating logic 202 is coupled to the arbiter1 110 via a bus 206. The bus 206 is a bi-directional bus and comprises a plurality of communication lines (not shown) to transmit control signals (not shown) between the gating logic 202 and the master1 110. Preferably, such control signals send transfer attributes and qualifiers for the request being made. A bus 208 is similarly configured as the bus 206 to be a bi-directional bus and comprises a plurality of communication lines (not shown) between the gating logic 202 and the master2 112 to transmit the control signals. The master1 102 is also coupled to the arbiter1 110 via a bus 210 to transmit an address and transfer qualifiers from the master1 102 to the arbiter1 110. Similarly, the master1 102 is coupled to the arbiter2 112 via a bus 212 to transmit an address and transfer qualifiers from the master1 102 to the arbiter2 112. The master1 102 is also coupled to the gating logic 202 via a bus 214 to transmit a read-not-write (RNW) bit and address bits from the master1 102 to the gating logic 202. The RNW bit, if asserted, indicates that a read operation is requested. If deasserted, it indicates that a write operation is requested. Preferably, the information such as the RNW bit and address bits transmitted via the bus 214 is obtained from the master1 102 via the bus 210.

Likewise, the master2 104 is coupled to a gating logic 216 via a bus 218 to transmit an arbitration request from the master2 104 to the gating logic 216. The gating logic 216 is coupled to the arbiter1 110 via a bus 220. The bus 220 is a bi-directional bus and comprises a plurality of communication lines (not shown) between the gating logic 216 and the master2 110 to transmit control signals. A bus 222 is similarly configured as the bus 220 to be a bi-directional bus and comprises a plurality of communication lines (not shown) between the gating logic 216 and the master2 112 to transmit control signals. The master2 104 is also coupled to the arbiter1 110 via a bus 224 to transmit an address and transfer qualifiers from the master2 104 to the arbiter1 110. Similarly, the master2 104 is coupled to the arbiter2 112 via a bus 226 to transmit an address and transfer qualifiers from the master2 104 to the arbiter2 112. The master2 104 is also coupled to the gating logic 216 via a bus 228 to transmit a RNW bit and address bits from the master2 104 to the gating logic 216. Preferably, the information such as the RNW bit and address bits transmitted via the bus 228 is obtained from the master2 104 via the bus 224.

The arbiter1 110 is coupled to the slave1 106 via busses 230, 232, 234, 236, and 238. The bus 230 carries an address and transfer qualifiers from the arbiter1 110 to the slave1 106. The bus 232 carries write data from the arbiter1 110 to the slave1 106. The bus 234 carries control data from the arbiter1 110 to the slave1 106. The bus 236 carries read data from the slave1 106 to the arbiter1 110. The bus 236 comprises an OR logic 240 to combine the read data. The bus 238 carries status and control data from the slave 1106 to the arbiter1 110. The bus 238 comprises an OR logic 242 to combine the status and control data.

Similarly, the arbiter2 112 is coupled to the slave2 108 via busses 244, 246, 248, 250, and 252. The bus 244 carries an address and transfer qualifiers from the arbiter2 112 to the slave2 108. The bus 246 carries write data from the arbiter2 112 to the slave2 108. The bus 248 carries control data from the arbiter2 112 to the slave2 108. The bus 250 carries read data from the slave2 108 to the arbiter2 112. The bus 250 comprises an OR logic 254 to combine the read data. The bus 252 carries status and control data from the slave2 108 to the arbiter2 112. The bus 252 comprises an OR logic 256 to combine the status and control data.

The psuedo-crossbar configuration as shown in FIG. 2 allows for "crossbarring" of address busses such as the busses 210 and 224, both of which busses are used to transmit an address and transfer qualifiers. This enables true concurrency and allows for simultaneous read and/or write operations. Preferably, the present invention can be implemented with discrete components such as the master1 102, the master2 104, the slave1 106, the slave2 108, the arbiter1 110, and the arbiter2 112. The use of these off-the-shelf components obviates the need for a custom design and creates a higher performance and more flexible crossbar implementation than provided by conventional designs.

In the psuedo-crossbar configuration of the block diagram 200, a first arbitration request is transmitted from the master1 102 to the gating logic 202 via the bus 204. The gating logic 202 also receives a first target address, in which a first operation (e.g., read or write) is to be performed, and a RNW bit from the master1 102. The gating logic 202 then decodes the first target address to determine which one of the slave1 106 and the slave2 108 is the target slave to perform the first operation on, and thus which one of the arbiter1 110 and the arbiter2 112 the first arbitration request should be transmitted to. Preferably, the gating logic 202 receives some information on the slave1 106 from the arbiter1 110 via the bus 206 to determine whether the first target address belongs to the slave 1 106. Likewise, the gating logic 202 receives some information on the slave2 108 from the arbiter2 112 via the bus 208 to determine whether the first target address belongs to the slave2 108.

Similarly, a second arbitration request is transmitted from the master2 104 to the gating logic 216 via the bus 218. The gating logic 216 also receives a second target address, in which a second operation (e.g., read or write) is to be performed, and a RNW bit from the master2 104 via the bus 224. The gating logic 216 then decodes the second target address to determine which one of the slave1 106 and the slave2 108 is the target slave to perform the second operation on, and thus which one of the arbiter1 110 and the arbiter2 112 the second arbitration request should be transmitted to. Preferably, the gating logic 216 receives some information on the slave1 106 from the arbiter1 110 via the bus 220 to determine whether the second target address belongs to the slave 1 106. Likewise, the gating logic 216 receives some information on the slave2 108 from the arbiter2 112 via the bus 222 to determine whether the second target address belongs to the slave2 108.

If the master1 102 is capable of performing pipeline operations, the gating logic 202 is also equipped with a first pipeline manager (not shown). Similarly, if the master2 104 is capable of performing pipeline operations, the gating logic 216 is also equipped with a second pipeline manager (not shown). Such pipeline operations generally refer to data operations that are designed to begin processing one data block while one or more prior data blocks are still being processed. For example, the master1 102 sends a first request to the gating logic 202, and thereafter sends a second request to the gating logic 202 while the first request is still being processed among the arbiter1 110, the arbiter2 112, the slave1 106, and/or the slave2 108. In this example, the master1 102 is capable of performing pipeline operations. Thus, the gating logic 202 is required to be able to receive the first request from the master1 102 while the second request is still being processed. In this case, the gating logic 202 needs to be equipped with the first pipeline manager to handle the pipeline operation.

Typically, a pipeline manager such as the first and the second pipeline managers would comprise a state machine (not shown) for each steered request that monitors the state of the requests targeted to the individual bus arbiters such as the arbiter1 110 and the arbiter2 112. The specific design and implementation of the pipeline manager is application-specific and thus is not described herein.

Given the pipeline capability of the arbiter1 110 and the arbiter2 112, the pipeline manager maintains separate read and write transaction queues to track the read and write requests and the depth of pipelining. Upon detection of a conflict, the pipeline manager generates a mask to block the request until the data tenure of the conflicting transaction completes. At that time, the mask is cleared and the pending transaction is allowed to proceed. Note that during the time of the blocked request, if any, for a given master such as the master1 102, other masters such as the master2 104 have full access to the individual bus segments such as the arbiter1 110 and the arbiter2 112, independent of the arbitration priority mechanism.

Furthermore, the pipeline manager can be easily customized for each bus master such as the master1 102 and the master2 104 to provide a more granular and device-specific addressing assignment for connection to the individual bus segments such as the arbiter1 110 and the arbiter2 112 to enable a flexible assignment of bus slaves such as the slave1 106 and the slave2 108.

The use of individual bus arbiters such as the arbiter1 110 and the arbiter2 112 leads to concurrent and independent arbitration on a per bus-segment basis. This enables different bus segments (i.e., bus arbiters) to operate in different modes of operation. For example, the arbiter1 110 can operate in a "fair" mode, whereas the arbiter2 112 can operate in a "fixed priority" mode. In the "fair" mode, the arbiter1 110 does not accept two consecutive requests from a single master. That is, if the arbiter1 110 accepted a first request from the master1 102, then the arbiter2 112 should accept a second request from the master2 104. In the "fixed priority" mode, the arbiter2 112 always accepts a bus master with a higher priority over a bus master with a lower priority.

Figure 3:
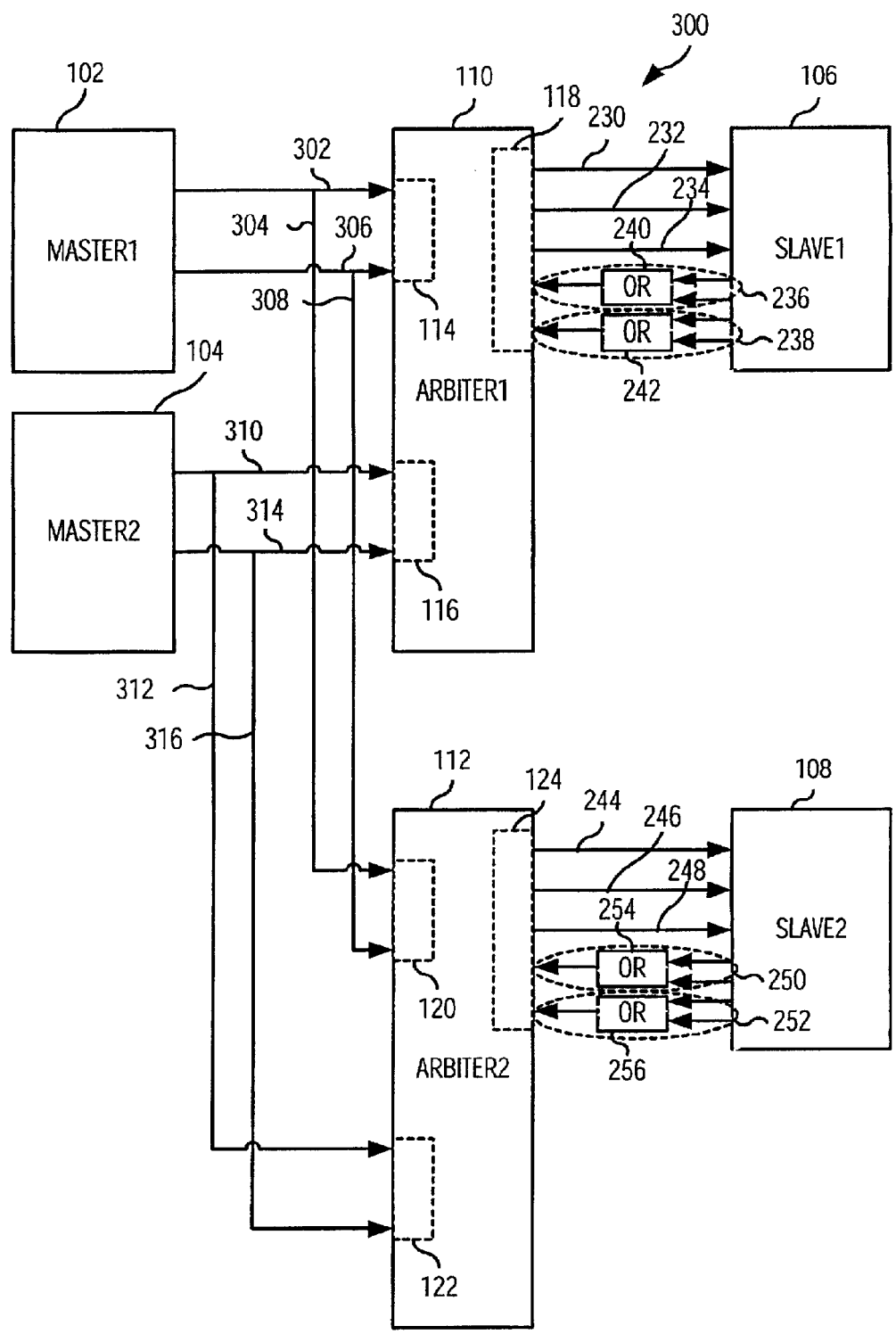
FIG. 3 depicts a block diagram showing a write-data operation in the psuedo-crossbar configuration of FIG. 1.

Now referring to FIG. 3, a block diagram 300 illustrates a write-data operation in the psuedo-crossbar configuration of FIG. 1. The master1 102 is coupled to the arbiter1 110 via a bus 302 to transmit write data from the master1 102 to the arbiter1 110. The master1 102 is also coupled to the arbiter2 112 via bus 304 to transmit write data from the master1 102 to the arbiter2 112. Similarly, the master1 102 is coupled to the arbiter1 110 via a bus 306 to transmit control data from the master1 102 to the arbiter1 110. The master1 102 is also coupled to the arbiter2 112 via bus 308 to transmit control data from the master1 102 to the arbiter2 112.

Likewise, the master2 104 is coupled to the arbiter1 110 via a bus 310 to transmit write data from the master2 104 to the arbiter1 110. The master2 104 is also coupled to the arbiter2 112 via bus 312 to transmit write data from the master2 104 to the arbiter2 112. Similarly, the master2 104 is coupled to the arbiter1 110 via a bus 314 to transmit control data from the master2 104 to the arbiter1 110. The master2 104 is also coupled to the arbiter2 112 via bus 316 to transmit control data from the master2 104 to the arbiter2 112.

The arbiter1 110 and the arbiter2 112 are coupled to the slave1 106 and the slave2 108, respectively, in the same manner as shown in FIG. 2 and described above.

In case where independent masters such as the master1 102 and the master2 104 request write operations to separate and independent slaves such as the slave1 106 and the slave2 108, such independent masters concurrently (i.e., during the same PLB clock cycle(s)) write to such separate and individual slaves. For example, when the master1 102 requests a first write operation to the slave1 106 and the master2 104 requests a second write operation to the slave2 108, the master1 102 and the master2 104 concurrently (i.e., during the same PLB clock cycle(s)) performs the first and the second write operations to the slave1 106 and the slave2 108, respectively.

In case where a single master such as the master1 102 and the master2 104 requests two or more write operations to the same or different slaves such as the slave1 106 and the slave2 108, such a single master writes to the same or different slaves sequentially. For example, when the master1 102 requests first and second write operations to the slave1 106, the master1 102 sequentially performs the first and the second write operations.

Figure 4:
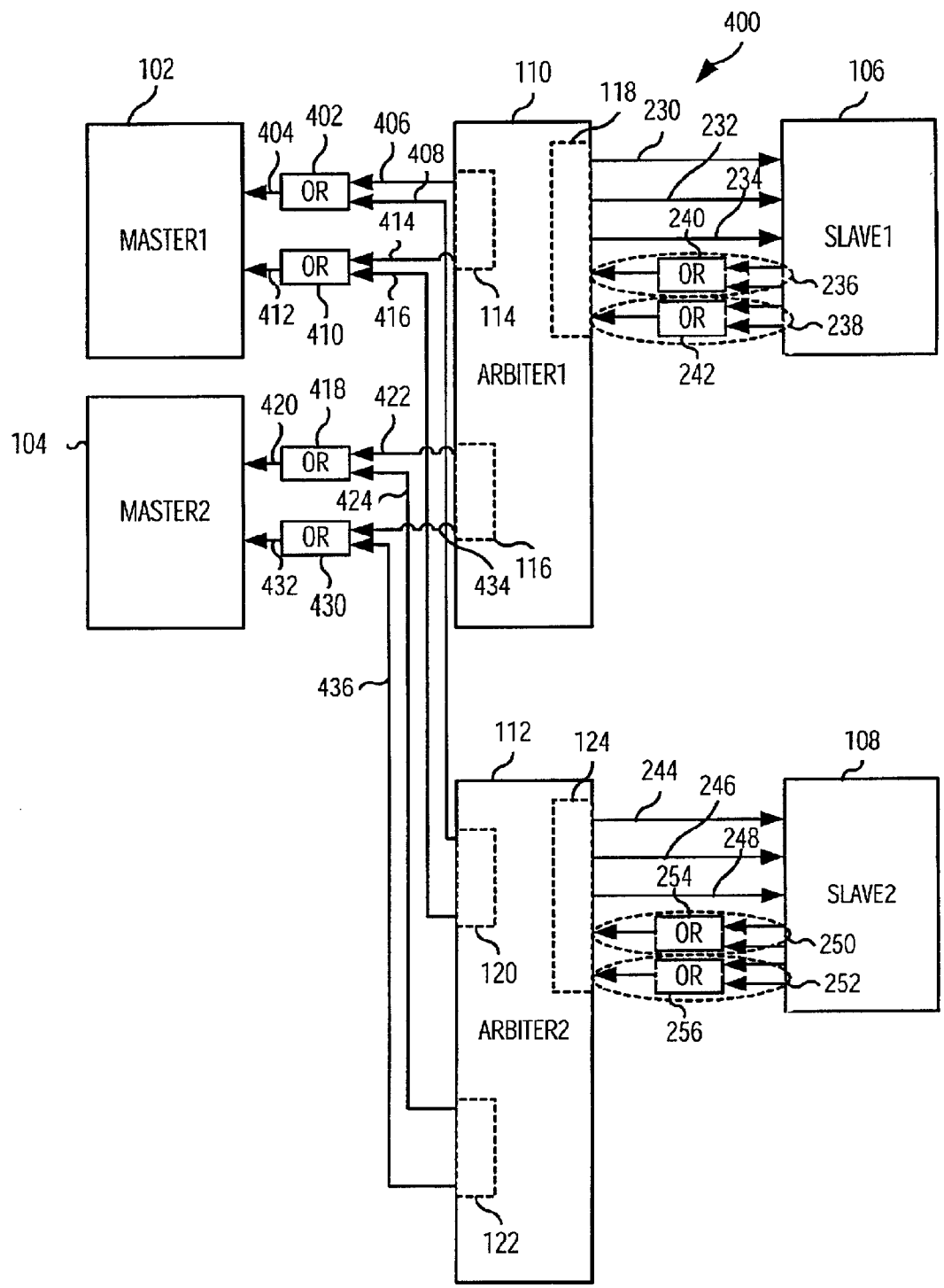
FIG. 4 depicts a block diagram showing a read-data operation in the psuedo-crossbar configuration of FIG. 1.

Now referring to FIG. 4, a block diagram 400 illustrates a read-data operation in the psuedo-crossbar configuration of FIG. 1. The master1 102 is coupled to the arbiter1 110 via an OR logic 402 and busses 404, 406, and 408 to transmit read data from the arbiter1 110 and the arbiter2 112 to the master1 102. The master1 102 is coupled to the OR logic 402 via the bus 404. The OR logic 402 is coupled to the arbiter1 110 and the arbiter2 112 via the busses 406 and 408, respectively. Therefore, the read data carried on the busses 406 and 408 are combined in the OR logic 402 to place read data on the bus 404. Since only one of the busses 406 and 408 carries a valid read data, the valid read data is placed on the bus 404 to be received by the master1 102.

Similarly, the master1 102 is coupled to the arbiter2 112 via an OR logic 410 and busses 412, 414, and 416 to transmit status-and-control data from the arbiter1 110 and the arbiter2 112 to the master1 102. The master1 102 is coupled to the OR logic 410 via the bus 412. The OR logic 410 is coupled to the arbiter1 110 and the arbiter2 112 via the busses 414 and 416, respectively. Therefore, the status-and-control data carried on the busses 406 and 408 are combined in the OR logic 410 to place read data on the bus 412. Since only one of the busses 414 and 416 carries a status-and-control data, the valid status-and-control data is placed on the bus 412 to be received by the master1 102.

Likewise, the master2 104 is coupled to the arbiter1 110 via an OR logic 418 and busses 420, 422, and 424 to transmit read data from the arbiter1 110 and the arbiter2 112 to the master2 104. The master2 104 is coupled to the OR logic 418 via the bus 420. The OR logic 418 is coupled to the arbiter1 110 and the arbiter2 112 via the busses 422 and 424, respectively. Therefore, the read data carried on the busses 422 and 424 are combined in the OR logic 418 to place read data on the bus 420. Since only one of the busses 422 and 424 carries a valid read data, the valid read data is placed on the bus 420 to be received by the master2 104. Similarly, the master2 104 is coupled to the arbiter2 112 via an OR logic 430 and busses 432, 434, and 436 to transmit status-and-control data from the arbiter1 110 and the arbiter2 112 to the master2 104. The master2 104 is coupled to the OR logic 430 via the bus 432. The OR logic 430 is coupled to the arbiter1 110 and the arbiter2 112 via the busses 434 and 436, respectively. Therefore, the status-and-control data carried on the busses 434 and 446 are combined in the OR logic 430 to place read data on the bus 432. Since only one of the busses 434 and 436 carries a status-and-control data, the valid status-and-control data is placed on the bus 432 to be received by the master2 104.

The arbiter1 110 and the arbiter2 112 are coupled to the slave 1106 and the slave2 108, respectively, in the same manner as shown in FIGS. 2 and 3 and described above.

In case where independent masters such as the master1 102 and the master2 104 request read operations from separate and independent slaves such as the slave1 106 and the slave2 108, such independent masters concurrently (i.e., during the same PLB clock cycle(s)) read from such separate and individual slaves. For example, when the master1 102 requests a first read operation from the slave1 106 and the master2 104 requests a second read operation from the slave2 108, the master1 102 and the master2 104 concurrently ((i.e., during the same PLB clock cycle(s)) performs the first and the second read operations from the slave1 106 and the slave2 108, respectively.

In case where a single master such as the master1 102 and the master2 104 requests two or more read operations from the same or different slaves such as the slave1 106 and the slave2 108, such a single master reads from the same or different slaves sequentially. For example, when the master1 102 requests first and second read operations from the slave1 106, the master1 102 sequentially performs the first and the second read operations.

It is noted that the psuedo-crossbar configuration 100 of FIG. 1 is expandable to include N bus arbiters coupled to X bus masters and Y bus slaves, wherein N, X, and Y each are any integers equal to or larger than 2. For example, the psuedo-crossbar configuration 100 is expandable to include three bus arbiters coupled to three bus masters and three bus slaves. It is also noted that the integers N, X, and Y do not have to be the same number. For example, the psuedo-crossbar configuration 100 is expandable to include three bus arbiters coupled to four bus masters and five bus slaves. Likewise, the modes of operation as shown in FIGS. 2–4 are expandable in the same manner as described above. The aforementioned expansion may be done without departing from the true spirit of the present invention as described herein.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. A system comprising:
 a first bus master;
 a second bus master;
 a first bus arbiter coupled to the first and the second bus masters;
 a second bus arbiter coupled to the first and the second bus masters;
 a first bus slave coupled to the first bus arbiter, the first bus master requesting a first data operation on the first bus slave via the first bus arbiter, the first data operation being performed during a first period;
 a second bus slave coupled to the second bus arbiter, the second bus master requesting a second data operation on the second bus slave via the second bus arbiter, the second data operation being performed during the first period;
 a first gating logic coupled to the first master for receiving the first arbitration request and the first address information from the first master, and coupled to the first bus arbiter for providing the first arbitration request to the first bus arbiter; and
 a second gating logic coupled to the second master for receiving the second arbitration request and the second address information from the second master, and coupled to the second bus arbiter for providing the second arbitration request to the second bus arbiter.

2. The system of claim 1, wherein the system is implemented on a semiconductor chip.

3. The system of claim 1, wherein the system adopts a processor local bus (PLB) protocol.

4. The system of claim 1, wherein the first and the second data operations each includes one of read and write operations.

5. The system of claim 1, wherein the first period contains one or more bus clock cycles in the system.

6. A system comprising:
 a first bus master configured for generating a first arbitration request and a first target address on which a first data operation is to be performed, the first target address containing first address information;
 a second bus master configured for generating a second arbitration request and a second target address on which a second data operation is to be performed, the second target address containing second address information;
 a first bus arbiter coupled to the first and second bus masters, the first bus arbiter receiving the first and the second target addresses from the first and the second bus masters, respectively, wherein the first arbitration request is provided to the first bus arbiter by decoding the first address information;

a second bus arbiter coupled to the first and the second bus masters, the second bus arbiter receiving the first and second target addresses from the first and the second bus masters, respectively, wherein the second arbitration request is provided to the second bus arbiter by decoding the second address information;

a first bus slave coupled to the first bus arbiter, the first bus master requesting the first data operation on the first bus slave via the first bus arbiter, the first data operation being performed during a first period; and a second bus slave coupled to the second bus arbiter, the second bus master requesting the second data operation on the second bus slave via the second bus arbiter, the second data operation being performed during the first period.

7. The system of claim 6, further comprising:

a first gating logic coupled to the first master for receiving the first arbitration request and the first address information from the first master, and coupled to the first bus arbiter for providing the first arbitration request to the first bus arbiter; and a second gating logic coupled to the second master for receiving the second arbitration request and the second address information from the second master, and coupled to the second bus arbiter for providing the second arbitration request to the second bus arbiter.

8. The system of claim 6, further comprising:

a first gating logic coupled to the first master for receiving the first arbitration request and the first address information from the first master, and coupled to the first bus arbiter for providing the first arbitration request to the first bus arbiter, wherein the first gating logic includes a first pipeline manager when the first bus arbiter is capable of performing pipeline operations; and a second gating logic coupled to the second master for receiving the second arbitration request and the second address information from the second master, and coupled to the second bus arbiter for providing the second arbitration request to the second bus arbiter, wherein the second gating logic includes a second pipeline manager when the second bus arbiter is capable of performing pipeline operations.

9. The system of claim 6, wherein the system is implemented on a semiconductor chip.

10. The system of claim 6, wherein the system adopts a processor local bus (PLB) protocol.

11. The system of claim 6, wherein the first and the second data operations each includes one of read and write operations.

12. The system of claim 6, wherein the first period consists of one or more bus clock cycles in the system.

13. The system of claim 6, wherein the first bus arbiter receives the first target address during a second period, and wherein the second bus arbiter receives the second target address during the second period.

14. The system of claim 6, wherein the first bus arbiter receives the first target address during a second period, wherein the second bus arbiter receives the second target address during the second period, and wherein the second period consists of one or more bus clock cycles in the system.

15. A system comprising:

a first bus master configured for generating a first arbitration request and a first target address on which a first data operation is to be performed, the first target address containing first address information;

a second bus master configured for generating a second arbitration request and a second target address on which a second data operation is to be performed, the second target address containing second address information;

a first bus arbiter coupled to the first and second bus masters, the first bus arbiter receiving the first and the second target addresses from the first and the second bus masters, respectively, wherein the first arbitration request is provided to the first bus arbiter by decoding the first address information;

a second bus arbiter coupled to the first and the second bus masters, the second bus arbiter receiving the first and second target addresses from the first and the second bus masters, respectively, wherein the second arbitration request is provided to the second bus arbiter by decoding the second address information;

a first bus slave coupled to the first bus arbiter, the first bus master requesting the first data operation on the first bus slave via the first bus arbiter, the first data operation being performed during a first period;

a second bus slave coupled to the second bus arbiter, the second bus master requesting the second data operation on the second bus slave via the second bus arbiter, the second data operation being performed during the first period;

a first gating logic coupled to the first master for receiving the first arbitration request and the first address information from the first master, and coupled to the first bus arbiter for providing the first arbitration request to the first bus arbiter, wherein the first gating logic decodes the first address information to determine that the first target address is located in the first bus slave, thereby providing the first arbitration request to the first bus arbiter; and a second gating logic coupled to the second master for receiving the second arbitration request and the second address information from the second master, and coupled to the second bus arbiter for providing the second arbitration request to the second bus arbiter, wherein the second gating logic decodes the second address information to determine that the second target address is located in the second bus slave, thereby providing the second arbitration request to the second bus arbiter.

16. The system of claim 15, wherein the first gating logic includes a first pipeline manager when the first bus arbiter is capable of performing pipeline operations, and wherein the second gating logic includes a second pipeline manager when the second bus arbiter is capable of performing pipeline operations.

17. The system of claim 15, wherein the system is implemented on a semiconductor chip.

18. The system of claim 15, wherein the system adopts a processor local bus (PLB) protocol.

19. The system of claim 15, wherein the first and the second data operations each includes one of read and write operations.

20. The system of claim 15, wherein the first period contains one or more bus clock cycles in the system.

21. The system of claim 15, wherein the first bus arbiter receives the first target address during a second period, and wherein the second bus arbiter receives the second target address during the second period.

22. The system of claim 15, wherein the first bus arbiter receives the first target address during a second period, wherein the second bus arbiter receives the second target address during the second period, and wherein the second period consists of one or more bus clock cycles in the system.

23. A system comprising:
- a plurality of bus masters including first and second bus masters;
- a plurality of bus arbiters including first and second bus arbiters, each of the plurality of bus arbiters being coupled to the plurality of bus masters, wherein the first and the second bus arbiters are coupled to the first and the second bus masters, respectively;
- a plurality of bus slaves including first and second bus slaves, each of the plurality of bus slaves being coupled to one of the plurality of bus arbiters, wherein the first and the second slaves are coupled to the first and the second arbiters, respectively, the first bus master requesting a first data operation on the first bus slave via the first bus arbiter, the first data operation being performed during a first period, the second bus slave coupled to the second bus arbiter, the second bus master requesting a second data operation on the second bus slave via the second bus arbiter, the second data operation being performed during the first period;
- a first gating logic coupled to the first master for receiving the first arbitration request and the first address information from the first master, and coupled to the first bus arbiter for providing the first arbitration request to the first bus arbiter; and
- a second gating logic coupled to the second master for receiving the second arbitration request and the second address information from the second master, and coupled to the second bus arbiter for providing the second arbitration request to the second bus arbiter.

* * * * *

UNITED STATES PATENT AND TRADEMARK OFFICE
CERTIFICATE OF CORRECTION

PATENT NO.    : 6,823,411 B2
DATED         : November 23, 2004
INVENTOR(S)   : Richard Gerard Hofmann and Barry Joe Wolford It is certified that error appears in the above-identified patent and that said Letters Patent is hereby corrected as shown below:

Column 7,
After line 39 and before 40, insert
 -- Similarly, the master2 104 is coupled to the arbiter2 112 via an OR logic 430 and busses 432, 434, and 436 to transmit status-and-control data from the arbiter1 110 and the arbiter2 112 the master2 104. The master2 104 is coupled to the OR logic 430 via the bus 432. The OR logic 430 is coupled to the arbiter1 110 and the arbiter2 112 via the busses 434 and 436, respectively. Therefore, the status-and-control data carried on the busses 434 and 446 are combined in the OR logic 430 to place read data on the bus 432. Since only one of the busses 434 and 436 carries a status-and-control data, the valid status-and-control data is placed on the bus 432 to be received by the master2 104. --

Signed and Sealed this

Twenty-second Day of February, 2005

JON W. DUDAS
*Director of the United States Patent and Trademark Office*